United States Patent [19]
Orsulak

[11] 3,891,263
[45] June 24, 1975

[54] SAFETY SHIELD AND COMPARTMENTIZER

[76] Inventor: Joseph Orsulak, 1908 Carol St., Bossier City, La. 71010

[22] Filed: Jan. 14, 1974

[21] Appl. No.: 433,391

[52] U.S. Cl. .......................... 296/24 R; 280/150 B
[51] Int. Cl. ...................... B60r 21/02; B62d 33/04
[58] Field of Search ................. 280/150 AB, 150 B; 296/24 R, 37 R; 160/27, 310, 301, 290

[56] References Cited
UNITED STATES PATENTS

| 1,762,480 | 6/1930 | Marenti | 160/310 X |
| 2,428,644 | 10/1947 | Zega | 160/290 R X |
| 2,773,547 | 12/1956 | Voss | 160/301 |
| 2,806,737 | 9/1957 | Maxwell | 280/150 AB |
| 3,370,886 | 2/1968 | Frost | 280/150 AB |
| 3,423,121 | 1/1969 | Lipkin | 280/150 B X |
| 3,617,073 | 11/1971 | Landsman | 280/150 AB |
| 3,643,972 | 2/1972 | Caiati | 280/150 B |
| 3,774,936 | 11/1973 | Barnett et al. | 280/150 AB |

*Primary Examiner*—David Schonberg
*Assistant Examiner*—John A. Pekar
*Attorney, Agent, or Firm*—John M. Harrison

[57] ABSTRACT

A protective safety shield and compartmentizer which is stored in and may be selectively retracted from a vehicle rear seat to form a barrier between the luggage compartment area and passenger area, in order to prevent luggage and other cargo from being thrown from the luggage compartment area into the passenger area in the event of a sudden stop by the vehicle; the protective safety shield includes a flexible panel rolled on a spindle mounted within the rear seat which panel can be retracted from a slot extending across the width of the rear seat, and the leading edge of the panel may be secured to fasteners on the roof, ceiling or other convenient area of the vehicle.

2 Claims, 11 Drawing Figures

PATENTED JUN 24 1975 3,891,263
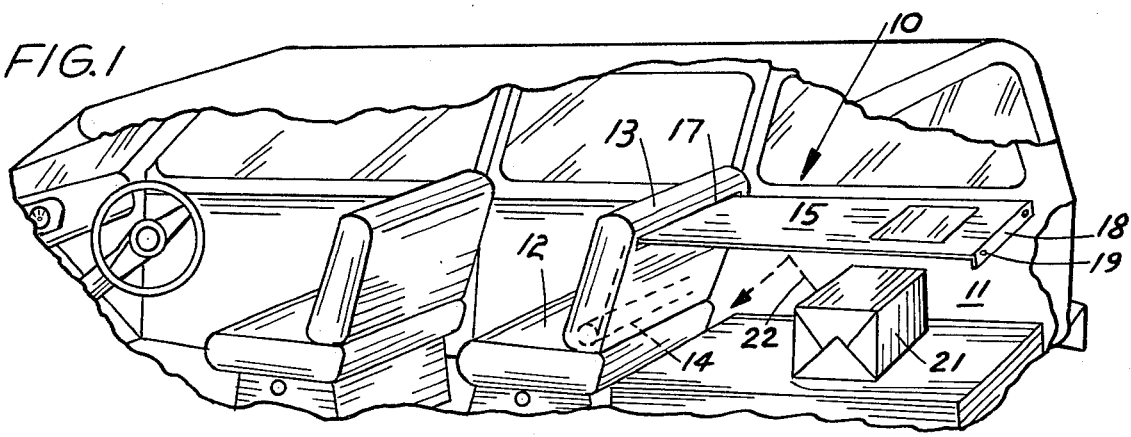
FIG.1
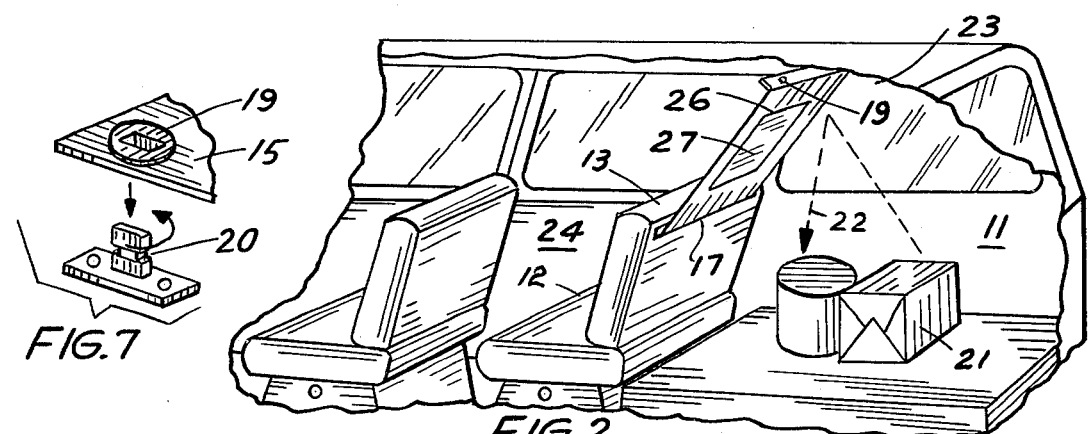
FIG.7
FIG.2
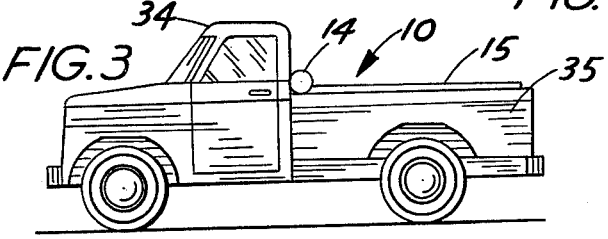
FIG.3
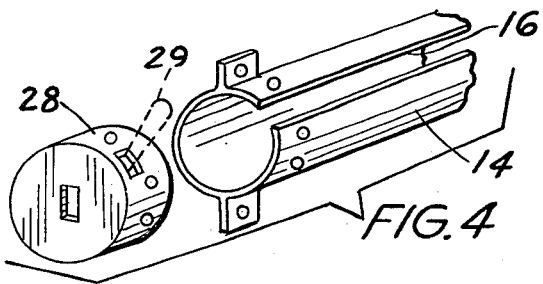
FIG.4
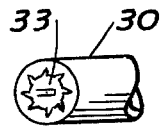
FIG.5
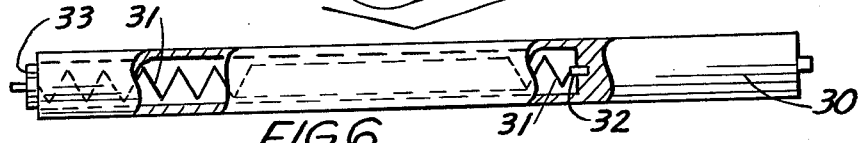
FIG.6
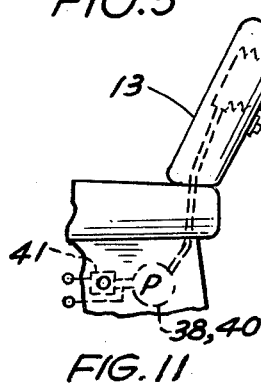
FIG.11
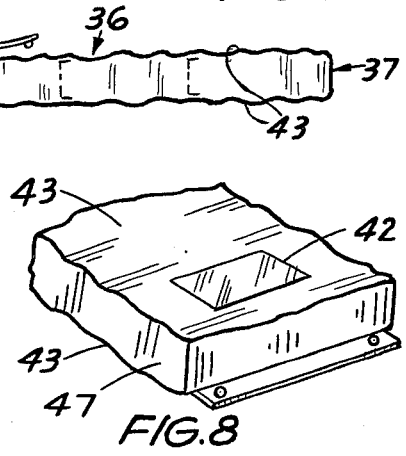
FIG.8
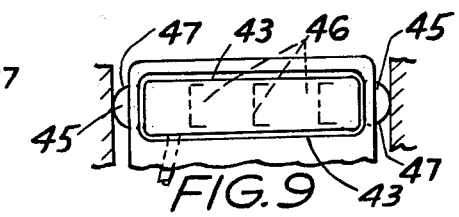
FIG.9
FIG.10

SAFETY SHIELD AND COMPARTMENTIZER

BACKGROUND OF THE INVENTION

1. Field of the Invention

This invention relates to safety devices for vehicles, including automotive vehicles and airplanes, and more specifically, to a safety shield built into the rear seat of a station wagon or other vehicle to prevent the contents of the vehicle luggage storage area from bouncing into the passenger area in the event of a sudden stop or accident.

2. Description of the Prior Art

Conventional automotive vehicles of the station wagon, van, and similar design as well as small private aircraft are provided with a luggage or storage area immediately behind the second seat of the station wagon, and the first seat of a van-type vehicle or aircraft. Sudden "panic" stops, front and side collisions and air turbulence of such vehicles frequently subjects the occupants to the hazard of luggage and cargo shifting suddenly from the rear of the vehicle to the front into the passenger area. Although the seat separating the luggage or other cargo from the driver and other passengers may prevent injury to the occupants if the stop is sudden from a relatively high rate of speed, or the turbulence severe in the case of aircraft, the storage compartment contents may spill over the top of the seat and injure the occupant or occupants.

The safety shield of this invention may also serve to hid articles of merchandise or luggage in the rear of the vehicle, since the device is capable of being pulled over such articles and attached to the rear of the vehicle. Thus, under circumstances where the vehicle must be parked at night in dark areas where it might be burglarized the shield can be used to cover and make obscure the vehicle contents.

Since the design of conventional station wagons and similar vehicles dictates that air conditioning systems installed therein must necessarily cool all areas of the vehicle, considerable heat loss is incurred and cooling efficiency impaired in cooling the storage areas of the vehicle in addition to the passenger area. Likewise, in cold climates, the storage area may be difficult to keep warm. Accordingly, the safety shield and compartmentizer of this invention may be easily adapted to permit cooling or heating of the passenger area, as desired, by selective manipulation in the manner hereinafter set forth.

Accordingly, it is a principle object of the invention to provide a barrier between the luggage or cargo area and the passenger area of a station wagon or other vehicle, including aircraft, to prevent the contents from being thrown against passengers in the event of accidents, turbulence, or sudden stops.

Another object of this invention is to provide a barrier which confines the air conditioned and heated area of a vehicle to that portion where the passengers are located to enhance the efficiency of the air conditioning and heating system.

Still another object of the invention is to provide a versatile compartmentizer which can be standardized as to size to fit both old and new vehicle models.

Yet another object of the invention is to provide a shield that is retractable into a rear seat of the vehicle so to be out of the way when not needed.

Still another object of the invention is to provide a compartmentizer which hides cargo from view so to not tempt prospective thieves.

A still further object of the invention is to provide a safety shield and compartmentizer which is simple in design, inexpensive to manufacture, rugged in construction, easy to use, and efficient in operation.

SUMMARY OF THE INVENTION

These and other objects of the instant invention will be readily evident upon a study of the following specification and the accompanying drawing wherein:

FIG. 1 is a perspective view of the invention shown in one configuration of use;

FIG. 2 is a similar view thereof shown in an alternative configuration;

FIG. 3 illustrates the invention shown in FIGS. 1 and 2 incorporated in the bed of a pick-up truck;

FIGS. 4, 5 and 6 illustrate details of the spindle and housing of the retractable canopy; and FIGS. 7, 8, 9, 10 and 11 further illustrate details of a modified design of the invention, wherein an inflatable pad normally stored in collapsible configuration in the seat, automatically extends when a button is activated or tripped to cause inflation of the pad. When inflated, the pad stretches sideways, extending to the car side walls for a better insulation seal. Optional fabric braces inside the pad maintain a desired vertical pad thickness.

Referring now to FIGS. 1 and 2 of the drawing, safety shield and compartmentizer 10 is illustrated installed in cargo area 11, behind a rear seat 12, of a station wagon. Back rest 13 of the vehicle rear seat is provided with cylindrical container 14 which contains a flexible, opaque panel 15, adapted to be pulled out of the container through longitudinal slot 16, in cylindrical container 14 (illustrated in FIG. 4) and outward of transverse slot 17, along the upper rear position of the back rest. Thus, the panel can be easily pulled from a stored, retracted position into a utility position. Leading edge 18 of the panel is provided with fasteners 19 that are engagable with corresponding fasteners 20, (illustrated in FIG. 7) on a rear wall of the vehicle, so that the panel may extend horizontally and retain cargo 21 therebelow. Accordingly, under these circumstances, the cargo will strike the underside of the panel and then fall down, as shown by arrow 22, in the event of an accident or sudden stop.

Additionally, fasteners may be provided in roof ceiling 23, as well as the rear wall of the vehicle, as illustrated in FIG. 2, so that alternately, the panel may form a generally vertical wall between passenger area 24 and cargo area 11. In order to permit the vehicle driver to see through the opaque panel when looking in his rear view mirror, the panel is fitted with a window opening 26 closed by transparent plastic film 27.

As illustrated in FIG. 4 of the drawing container 14, located within the seat back-rest, may alternatively be provided with electric motor 28 to roll up the panel after use, the motor being in circuit with switch 29 and the vehicle battery. Alternately, as illustrated in FIGS. 5 and 6, the panel can be easily rewound by a conventional window shade apparatus, which includes a hollow spindle 30 with coil spring 31 inside anchored at one end 32 to the spindle, the opposite end being connected to ratchet wheel 33, engaged by a manually controlled pawl, not illustrated.

As illustrated in FIG. 3, the invention may be installed on a pick-up truck 34 to cover bed 35, in order to hide cargo from view and thus not tempt prospective thieves, as well as to prevent cargo spill in case of sudden stop or accident. The compartmentizer illustrated in FIGS. 1 and 2 in the rear of a station wagon will, of course, serve the same function.

In FIGS. 7-11, a modified design of safety shield 36 includes panel 37 which is hollow and constructed of air-tight, plastic sheeting to enable inflation by air pump 38, thus effecting automatic ejection from seat back rest 13. A hose connects the pump to the panel interior, as illustrated. Pump 38 is driven by electric motor 40 operated through switch 41. Windows 42 are provided on both side walls 43 of the vehicle to allow view therethrough. When the panel is inflated, it bulges sidewardly as shown by dotted lines in FIG. 9, to close the areas 45 along each side of the vehicle in order to be more effective in segregating the air conditioned or heated passenger area from the cargo area. Tapes 46, located between walls 43, control expansion of the walls, while allowing end walls 47 to bulge sideward.

As heretofore noted, the invention may be readily adapted to small private aircraft having storage compartments immediately behind the pilot and copilot seats. The compartmentizer can be built to general specifications for quick and easy installation in the seats of the airplanes as well as substantially any other vehicle.

In a preferred embodiment of the invention the spindle and panel may be mounted in any convenient position inside the vehicle to permit extension of the panel over cargo to achieve the desired protection. For example, in van-type trucks the spindle-panel combination may be mounted on or in the floor immediately behind the seats, and the panel may be extended upwardly and to the rear of the truck, over the cargo and attached to the rear area of the truck in any convenient manner. Alternatively, the spindle and panel may be affixed to the back rests of the seat or seats of the vehicle, and the panel extended from this position either upwardly to seal the driver area from the cargo section, or directly over the cargo to hold it in place.

In a more preferred embodiment of the invention the spindle and attached panel are mounted inside the seat back rest or back rests, depending upon the desired panel width needed, and the panel is extended from a slot in the back rest as heretofore set forth in the drawing. More preferably, the spindle and panel are rotatably encapsulated in a cylindrical container as also illustrated in the drawing. The container can be custom built for installation in a wide variety of vehicles, including trucks, vans, buses, airplanes and cars, particularly, station wagons. Furthermore, as heretofore noted, the spindle can be fitted with a ratchet and pawl mechanism for easy retraction of the panel on the spindle. Alternatively, the spindle can be installed in cooperation with a reversable electric motor to effect automatic panel extension and retraction, and fittings can be installed at any desirable location in the vehicle to removably attach the extended panel to the vehicle.

Having described my invention with the particularity set forth above, what is claimed is:

1. A safety shield and compartmentizer for mounting in a vehicle comprising:
   a. A rotatably mounted spindle positioned in the seat back rest of said vehicle, said seat back rest being fitted with a longitudinal back rest slot across the width thereof;
   b. A flexible panel, positioned in said seat back rest one end of which is attached to said spindle, said panel being adapted to selectively roll up on and retract from said spindle; and
   c. Fastening means attached to the opposite end of said panel for fastening said panel to preselected areas of said vehicle.

2. A safety shield and compartmentizer for mounting in a vehicle comprising:
   a. A rotatably mounted spindle positioned in the seat back rest of said vehicle, said seat back rest being fitted with a longitudinal back rest slot across the width thereof;
   b. A flexible panel, positioned in said seat back rest one end of which is attached to said spindle, said panel being adapted to selectively roll up on and retract from said spindle;
   c. Fastening means attached to the opposite end of said panel for fastening said panel to preselected areas of said vehicle;
   d. A cylindrical container having a longitudinal container slot along the length thereof carrying said spindle and said panel and positioned in the seat back rest of said vehicle, said seat back rest slot being in registry with said container slot to permit extension and retraction of said panel through said back rest slot to and from the interior of said seat back rest;
   e. A spring carried by said spindle; and
   f. Ratchet and pawl means in cooperation with said spring and said spindle to effect selective automatic winding of said panel on said spindle.

* * * * *